US007587014B2

(12) United States Patent
Lin

(10) Patent No.: US 7,587,014 B2
(45) Date of Patent: Sep. 8, 2009

(54) DIGITAL FREQUENCY/PHASE RECOVERY CIRCUIT

(75) Inventor: Wen-Chang Lin, Chu Tung Town (TW)

(73) Assignee: Sunext Technology Co., Ltd., Hsin-Chu (TW)

( * ) Notice: Subject to any disclaimer, the term of this patent is extended or adjusted under 35 U.S.C. 154(b) by 679 days.

(21) Appl. No.: 11/318,430

(22) Filed: Dec. 28, 2005

(65) Prior Publication Data

US 2006/0159211 A1 Jul. 20, 2006

(30) Foreign Application Priority Data

Jan. 18, 2005 (TW) .............................. 94101434 A

(51) Int. Cl.
*H04L 7/00* (2006.01)
(52) U.S. Cl. ...................... 375/355; 375/354; 375/373; 375/375; 327/141; 327/144; 327/146; 327/151; 327/152
(58) Field of Classification Search ................. 375/355, 375/354, 375, 373; 327/141, 144, 146, 151, 327/152
See application file for complete search history.

(56) References Cited

U.S. PATENT DOCUMENTS

| 7,327,400 | B1 * | 2/2008 | Greenberg | ................... 348/536 |
| 2002/0056069 | A1 * | 5/2002 | Abe et al. | ....................... 716/1 |
| 2002/0057118 | A1 * | 5/2002 | Tang | ........................... 327/158 |
| 2004/0196939 | A1 * | 10/2004 | Co | .............................. 375/376 |
| 2005/0078782 | A1 * | 4/2005 | Dunning et al. | ............. 375/373 |
| 2005/0156637 | A1 * | 7/2005 | Ngo | ........................... 327/113 |

OTHER PUBLICATIONS

Kurt H. Mueller et al., IEEE Transactions on Communications, vol. Com-24, No. 5, May 1976, pp. 516-531.
Gardner, IEEE Transactions on Communications, vol. Com-34, No. 5, May 1986, pp. 423-429.

* cited by examiner

*Primary Examiner*—Mohammad H Ghayour
*Assistant Examiner*—Leila Malek
(74) *Attorney, Agent, or Firm*—Muncy, Geissler, Olds & Lowe, PLLC

(57) ABSTRACT

A digital frequency/phase recovery circuit includes a comparator with hysteresis, a counter, a frequency determiner, a multi-phase clock generator, a transition detector, a phase adjuster, and a multiplexer. The comparator with hysteresis receives the input signal and generates a comparison signal. The counter receives the comparison signal, calculates the pulse number of the comparison signal in one period, and outputs a pulse value. The frequency determiner receives the pulse value, calculates the frequency of the input signal, and generates a frequency value. The multi-phase clock generator receives the frequency value and generates multi-phase reference clocks according to the frequency value. The transition detector receives the comparison signal and generates a transition signal. The phase adjuster receives the transition signal and the sampling clock and generates a phase selection signal, and the multiplexer receives the multi-phase reference clocks and selects one reference clock as the sampling clock according to the phase selection signal.

5 Claims, 8 Drawing Sheets

DIGITAL FREQUENCY/PHASE RECOVERY CIRCUIT

This application claims the benefit of the filing date of Taiwan Application Ser. No. 094101434, filed on Jan. 18, 2005, the content of which is incorporated herein by reference.

BACKGROUND OF THE INVENTION (a) Field of the Invention

The invention relates to a frequency/phase recovery circuit, particularly a digital frequency/phase recovery circuit in which the frequencies of multi-phase reference clocks are identical to the frequency of an input signal, and the phase of the input signal determines which multi-phase reference clock is to be selected as an output clock.

(b) Description of the Related Art

In the process of transmitting signals, when the channel bandwidth is lower than the bandwidth of the signals transmitted in the channel, inter-symbol interference (ISI) may occur in adjacent bits of the signals. In order to mitigate the inter-symbol interference (ISI), a signal processing technique called partial response maximum likelihood (PRML) is widely used. However, when such technique is applied, the input signal must be accurately sampled in order to generate data correctly.

FIG. 1 shows a block diagram illustrating the architecture of the PRML signal processing used to read out data such as recorded information on a disc. Referring to FIG. 1, the architecture includes an analog to digital converter (ADC) 12, an adaptive equalizer 13, a Viterbi decoder 14, and a timing recovery circuit 15. The ADC 12 receives an input signal, such as a radio frequency (RF) signal read out from a disc, and samples the input signal according to a sampling clock to generate a sampled signal. The adaptive equalizer 13 receives the sampled signal and generates an equalization signal, and the Viterbi decoder 14 decodes the equalization signal to produce an associated output signal. The timing recovery circuit 15 generates the sampling clock for the ADC 12 according to the input signal, so that the ADC 12 is able to correctly sample the input signal at a proper sampling point. The architectures of the adaptive equalizer 13 and the Viterbi decoder 14 belong to conventional arts, thus not to be explained in detail.

However, the phase of the sampling clock generated by the timing recovery circuit 15 may fail to be picked at the best sampling point, then this may result in a sampling error for the ADC 12 to cause the Viterbi decoder 14 to incorrectly decode the equalization signal.

The example references regarding the typical PRML technique are listed below:

1. Kurt H. Mueller, Markus Muller, "Timing recovery in digital Synchronous data receivers", IEEE Trans. on Comms., Vol., com-24, No. 5, May 1976, pp. 516-531. The reference discloses an algorithm where the sampling frequency is given as 1/T; however, the algorithm achieves only phase synchronization but without frequency synchronization.
2. Alexander Taratorin, "Characterization of Magnetic Recording Systems", pp. 187-188. The disclosed system generates a sampling clock by means of a signal-slope technique where the sampling frequency must be higher than 1/T to acquire a slope signal, and hence the consuming power of the ADC is considerable and its design architecture is complicated. Further, the disclosed system achieves only phase synchronization but without frequency synchronization.
3. F. M. Gardner, "ABPSK/QPSK Timing Error Detector for Sampled Receiver", IEEE Trans. On Comms., vol. COM-34, May 1986, pp. 423429. The reference discloses a detector algorithm where the sampling frequency is given as 2/T, so that the consuming power of the ADC is considerable and its design architecture is complicated. Further, the detector algorithm achieves only phase synchronization but without frequency synchronization.

However, a phase-looked loop commonly used in the above PRML techniques to achieve frequency synchronization is not fully digitalized. Hence, the consuming power fails to go down, and the benefit of power reduction cannot be achieved even if the fabrication processes are improved.

BRIEF SUMMARY OF THE INVENTION

Hence, an object of the invention is to provide a digital frequency/phase recovery circuit in which the frequencies of multi-phase reference clocks are identical to the frequency of an input signal, and the phase of the input signal determines which multi-phase reference clock is to be selected as an sampling clock.

According to the invention, a digital frequency/phase recovery circuit includes a comparator with hysteresis, a counter, a frequency determiner, a multi-phase clock generator, a transition detector, a phase adjuster, and a multiplexer. The comparator with hysteresis receives the input signal and generates a comparison signal, wherein the level of the comparison signal is high when the level of the input signal is higher than a high reference voltage, and the level of the comparison signal is low when the level of the input signal is lower than a low reference voltage. The counter receives the comparison signal, calculates the number of pulse of the comparison signal in one period relating to a counting clock, and outputs a pulse value. The frequency determiner receives the pulse value, calculates the frequency of the input signal, and generates a frequency value. The multi-phase clock generator receives the frequency value and generates multiple reference clocks with identical frequencies and distinct phases according to the frequency value. The transition detector receives the comparison signal and generates a transition signal, wherein the transition signal is enabled for a preset period as the comparison signal is changing from a high level to a low level or from a low level to a high level. The phase adjuster receives the transition signal and the sampling clock and generates a phase selection signal according to the phase relationship between the sampling clock and the transition signal. The multiplexer receives the multiple reference clocks and selects one reference clock as the sampling clock according to the phase selection signal.

Through the design of the invention, even if the frequency of the input signal varies with time, the frequency of the multi-phase reference clock may be adjusted to comply with the time-varied signal frequency, so that the frequency of the sampling clock may vary with the time-varied frequency of the input signal to sample an input signal at a best sampling point.

DETAILED DESCRIPTION OF THE INVENTION

The digital frequency/phase recovery circuit according to the invention will be described with reference to the accompanying drawings.

Figure 1:
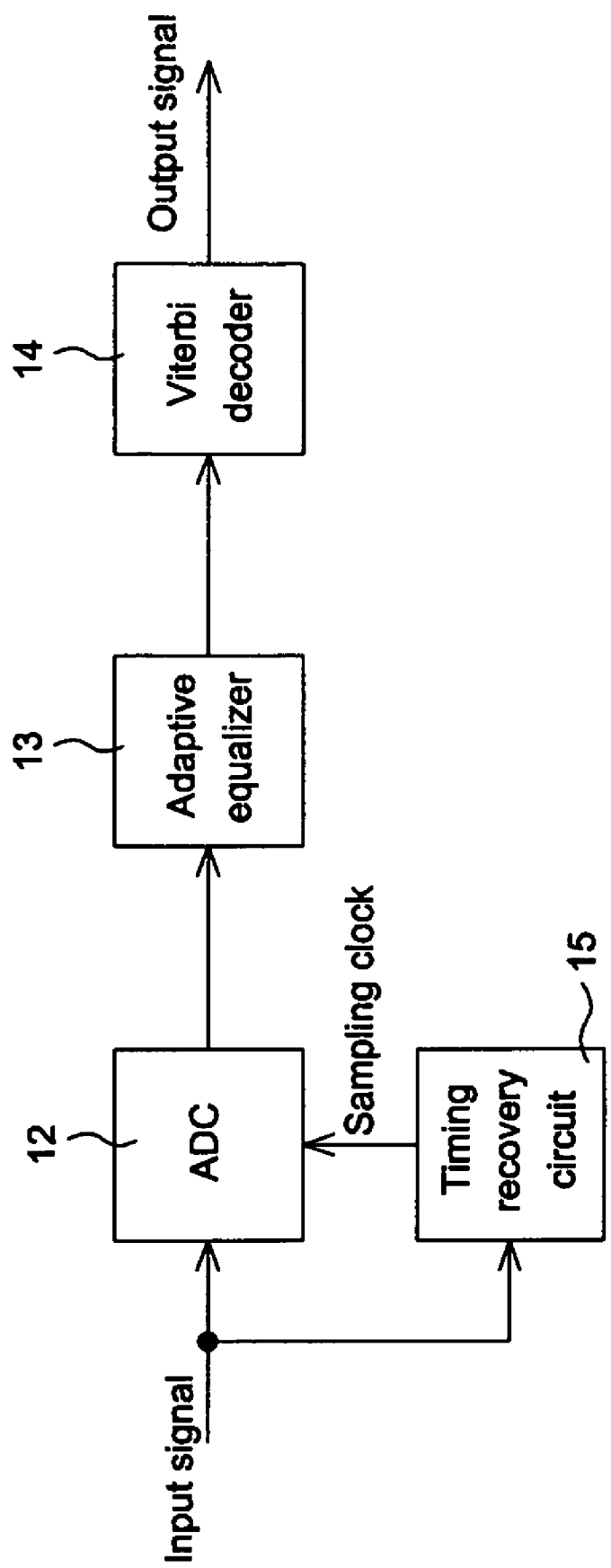
FIG. 1 shows a block diagram illustrating the architecture of the PRML signal processing used to read out data such as recorded information on a disc.
Figure 2:
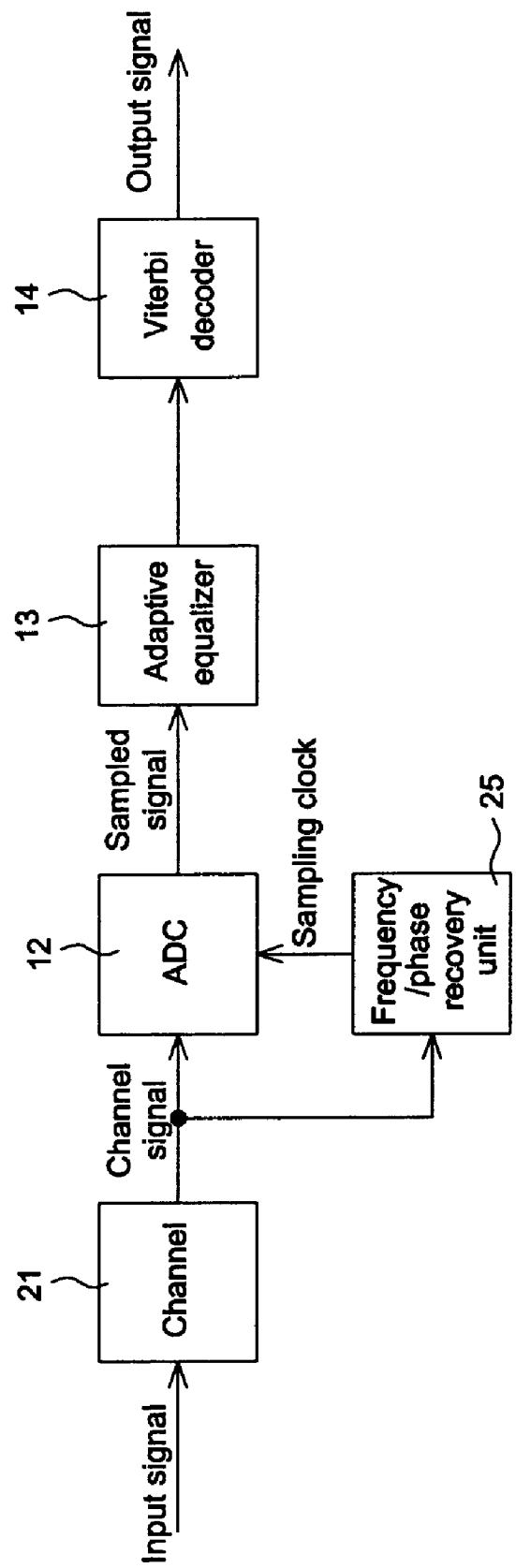
FIG. 2 shows a block diagram illustrating the architecture of a PRML signal processing applied on a digital frequency/phase recovery circuit.

FIG. 2 shows a block diagram illustrating the architecture of a PRML signal processing applied on a digital frequency/phase recovery circuit. Referring to FIG. 2, the architecture includes a channel 21, an analog to digital converter (ADC) 12, an adaptive equalizer 13, a Viterbi decoder 14, and a frequency/phase recovery unit 25. The ADC 12 receives an input signal such as a radio frequency (RF) signal read out from a disc and samples the input signal according to a sampling clock to generate a sampled signal. The adaptive equalizer 13 receives the sampled signal and generates an equalization signal. The Viterbi decoder 14 decodes the equalization signal to produce an associated output signal. The frequency/phase recovery circuit 25 generates the sampling clock for the ADC 12 according to the input signal, so that the ADC 12 can correctly sample the input signal at a proper sampling point. The architectures of the adaptive equalizer 13 and Viterbi decoder 14 belong to conventional arts, thus not to be explained in detail.

Figure 3:
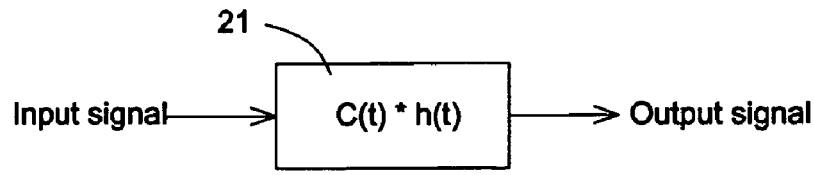
FIG. 3 shows a schematic diagram illustrating an embodiment of a channel.
Figure 4A:
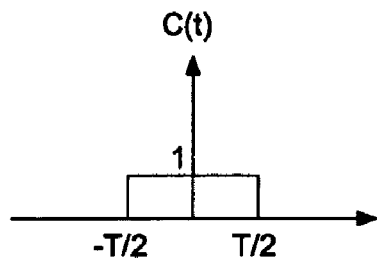
FIG. 4A illustrates the waveform of the step function C(t) shown in FIG. 3.
Figure 4B:
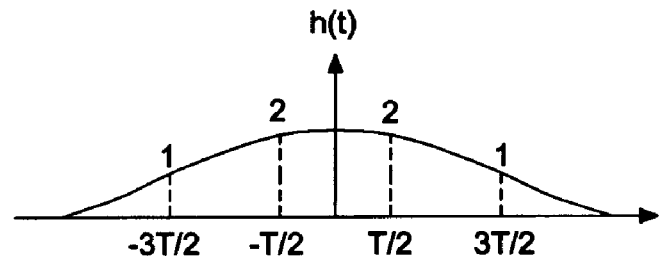
FIG. 4B illustrates the waveform of the function h(t) shown in FIG. 3.

Since the input signal read out from the disc is a non-return zero (NRZ) signal, with its value being 1 or −1, the input signal allows to be converted into a channel signal by means of the channel 21. For example, the input signal having a value 1 or −1 may be converted into a signal having a value 0, +2, −2, +4, −4, +6, or −6 by a partial response channel of PR1221 model. FIG. 3 shows a schematic diagram illustrating an embodiment of the channel 21. Referring to FIG. 3, the channel 21 is represented as a transfer function C(t)*h(t), where C(t) is a step function as shown in FIG. 4A, and the function h(t) is plotted in FIG. 4B.

Figure 5:
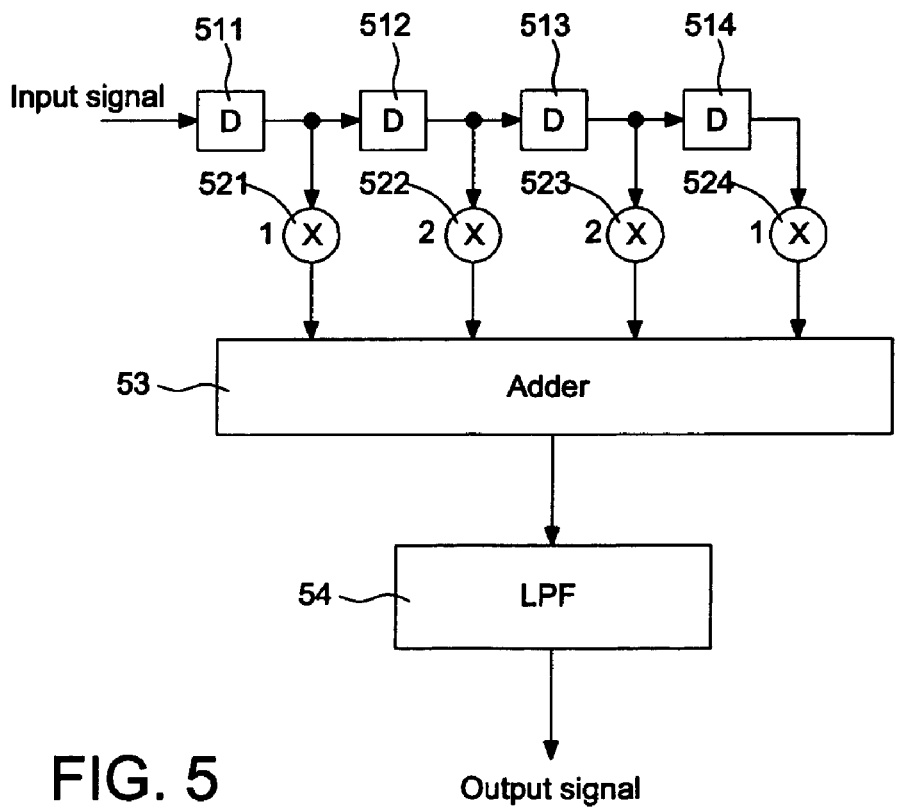
FIG. 5 shows a block diagram illustrating circuit architecture for implementing a channel of PR1221 polynomial.
Figure 6:
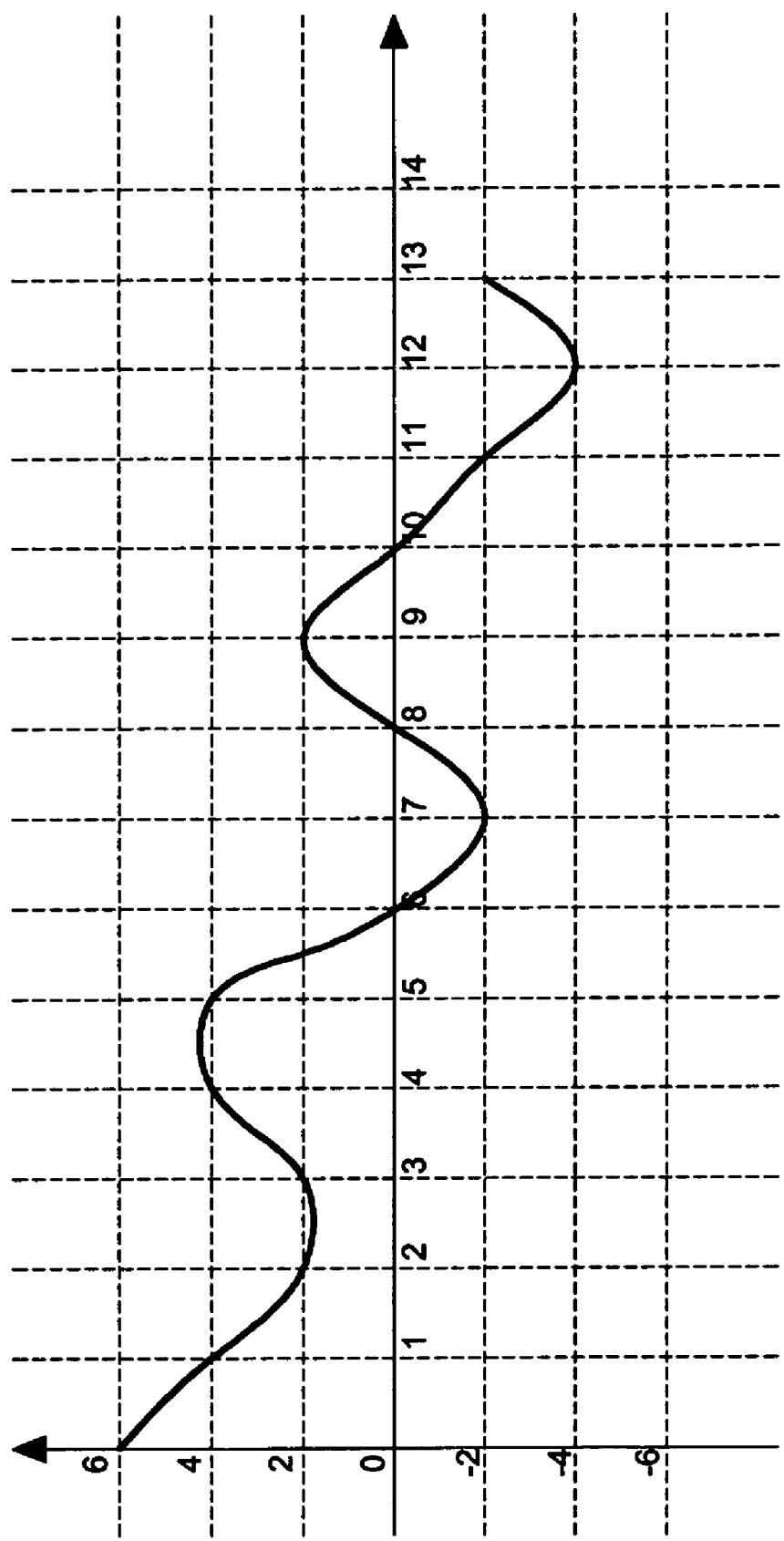
FIG. 6 shows a wave example of channel signals.

FIG. 5 shows a block diagram illustrating circuit architecture for implementing a channel of PR1221 model. The channel architecture includes four delay units 511-514, four multipliers 521-524, an adder 53, and a low pass filter 54. The four delay units 511-514 are serially coupled to cause a time delay of one period T. Each of the multipliers 521-524 receives an input signal from its corresponding delay unit, and the four input signal are respectively multiplied with four weighted value 1, 2, 2, 1. Finally, the adder 53 sums up the outputs of the four multipliers 521-524. Hence, as shown in FIG. 6, an input signal sequence +1, +1, +1, +1, −1, +1, +1, +1, −1, −1, +1, +1, −1, −1, −1, −1, +1 are transformed into an output signal sequence +6, +4, +2, +2, +4, +4, 0, −2, 0, +2, 0, −2, −4, −2 after converted through the PR1221 model.

Figure 7:
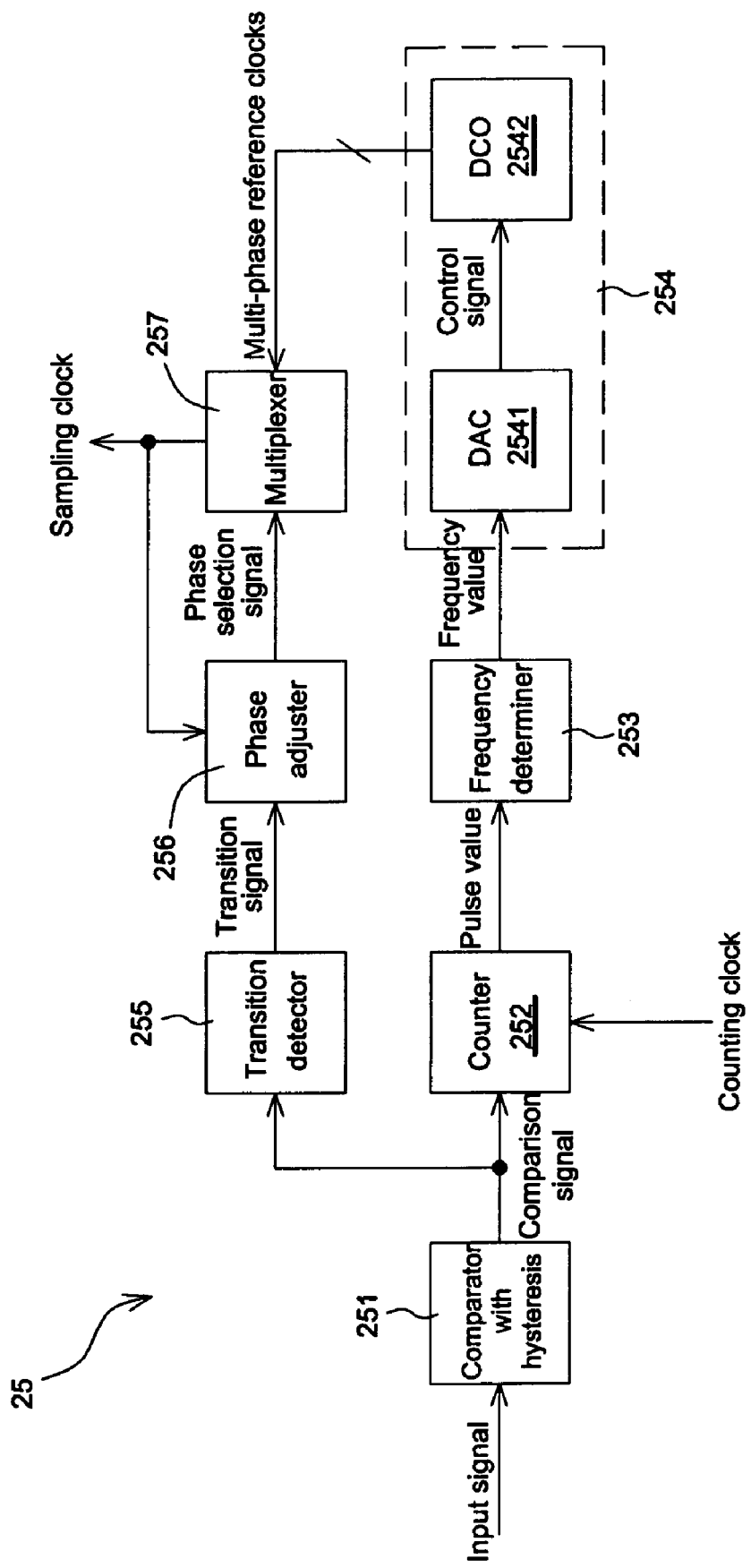
FIG. 7 shows a block diagram illustrating a digital frequency/phase recovery unit.

FIG. 7 shows a block diagram illustrating a digital frequency/phase recovery unit 25. Referring to FIG. 7, the frequency/phase recovery unit 25 includes a comparator with hysteresis 251, a counter 252, a frequency determiner 253, a multi-phase clock generator 254, a transition detector 255, a phase adjuster 256, and a multiplexer 257.

The comparator with hysteresis 251 receives the input signal and generates a comparison signal. The level of the comparison signal is set to state "H" when the level of the input signal is higher than a high reference voltage VHref; while the level of the comparison signal is set to state "L" when the level of the input signal is lower than a low reference voltage VLref. The counter 252 receives the comparison signal, calculates the pulse number of the comparison signal under the high and low states relating to a counting clock, and then outputs a pulse value. Herein, the frequency of the counting clock is higher than that of the comparison signal. The frequency determiner 253 receives the pulse value, calculates the frequency of the input signal under low and high states, and generates a frequency value Vf. The multi-phase clock generator 254 receives the frequency value and generates multi-phase reference clocks having identical frequencies but distinct phases according to the frequency value. The transition detector 255 receives the comparison signal and generates a transition signal. The transition signal is enabled for a preset period as the comparison signal is changing from a high level to a low level, or vice versa. The phase adjuster 256 receives the transition signal and the sampling clock and generates a phase selection signal according to the phase relationship between the sampling clock and the transition signal. The multiplexer 257 receives the multi-phase reference clocks and selects one reference clock as the sampling clock according to the phase selection signal.

Hence, it can be seen that, besides the transition detector 255, the phase adjuster 256, and the multiplexer 257 altogether are used to adjust the phase of the sampling clock. The counter 252, the frequency determiner 253, and the multi-phase clock generator 254 are also incorporated in the frequency/phase recovery unit 25 to provide the multi-phase reference clock corresponding to the frequency of the input signal. Hence, even if the frequency of the input signal varies with time, the frequency of the multi-phase reference clock may be adjusted to comply with the time-varied signal frequency, so that the frequency of the sampling clock may vary with the time-varied frequency of the input signal to have the ADC sample an input signal at a best sampling point. To the contrary, a commonly used timing recovery circuit achieves only phase adjustment.

Referring to FIG. 7 again, the multi-phase clock generator 254, which is used to generate multi-phase frequency clocks having identical frequency and different phases, includes a digital to analog converter (DAC) 2541 and a digital control oscillator (DCO) 2542. The DAC 2541 receives the frequency value and converts it into a control signal. The DCO 2542 receives the control signal and generates the multi-phase frequency clocks. The architectures of the DAC and the DCO are known as prior art, thus not to be explained in detail. Also, any circuit may serve for the subject invention only as it is able to generate multi-phase reference clocks corresponding to a specific frequency value.

Figure 8:
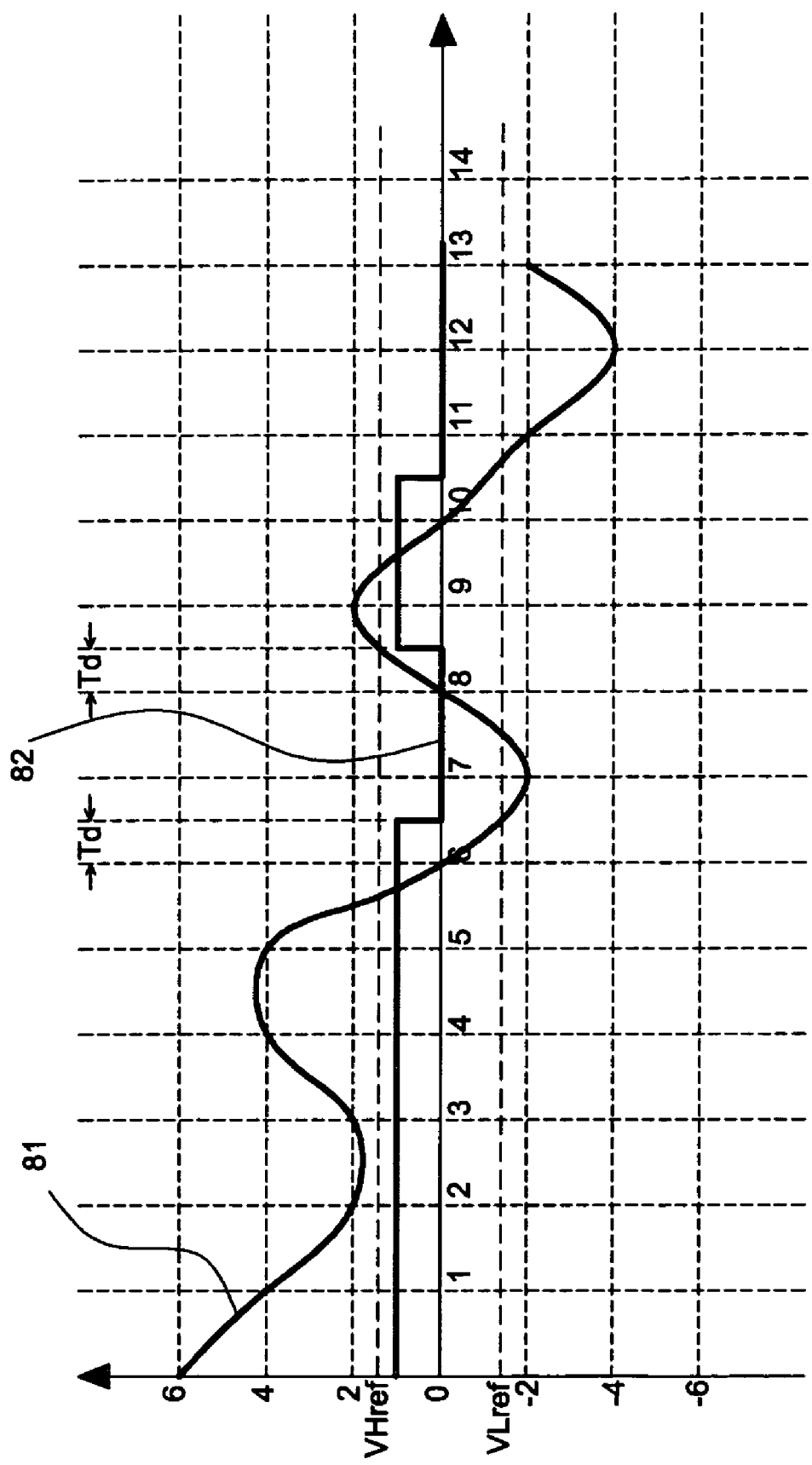
FIG. 8 shows a waveform diagram illustrating an output wave of the comparator with hysteresis.

FIG. 8 shows a waveform diagram illustrating an output wave of the comparator with hysteresis 251. Referring to FIG. 8, a curve 81 indicates channel signal fed into the comparator with hysteresis 251, and a curve 82 indicates comparison signal generated after hysteresis comparison. Since the channel signal fed into the comparator with hysteresis 251 often suffers noise interference, the resulting waveform is thus somewhat defective. Hence, according to the invention, the comparator with hysteresis 251 is used to generate an ideal comparison signal. The comparison signal is set to state "L" only as the level of the channel signal is lower than the low reference voltage VLref; while the comparison signal is set to state "H" only as the level of the channel signal is higher than the high reference voltage Vhref. Hence, the slight oscillation of the channel signal around level 0, once occurred, would not affect the output of the comparison signal. Thus, as shown in FIG. 8, the transition point of the comparison signal is delayed with a given fixed time Td compared to the actual sampling point.

Figure 9:
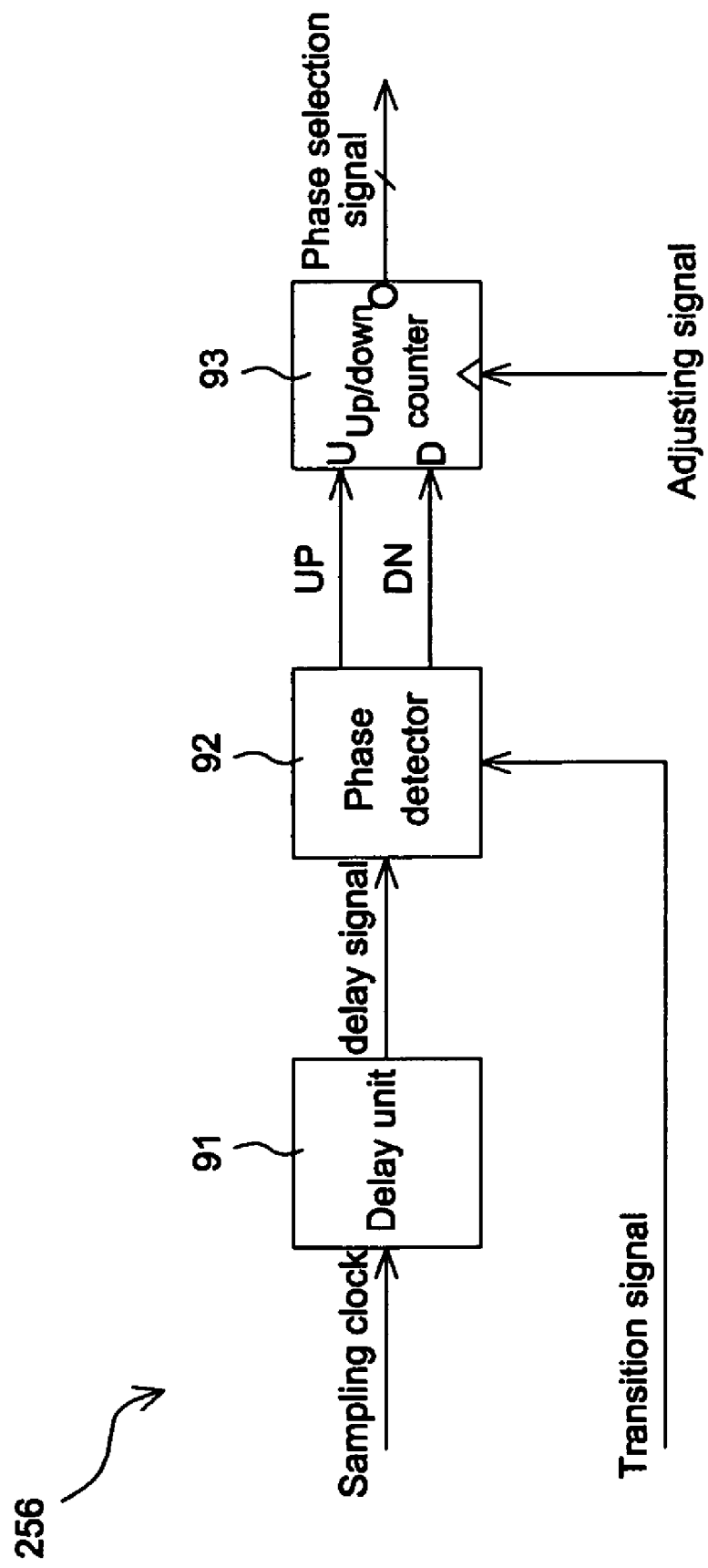
FIG. 9 shows a block diagram illustrating a phase adjuster.

FIG. 9 shows a block diagram illustrating a phase adjuster 256. Referring to FIG. 9, the phase adjuster 256 includes a delay unit 91, a phase detector 92 and an up/down counter 93. It can be seen that, from FIG. 8, the transition point of the comparison signal is delayed with a fixed time Td compared to the actual sampling point. Hence, the delay unit 91 of the phase adjuster 256 receives a sampling clock, delays it with a fixed time Td, and then output it as a delay signal. The phase detector 92 receives the delay signal and a transition signal and compares their phase difference to output control signals UP and DN. Specifically, the level of the control signal UP is high and the level of the DN is low as the phase of the delay signal advances that of the transition signal. To the contrary, the level of the control signal UP is low and the level of the DN is high as the phase of the delay signal lags behind that of the transition signal. Hence, the up/down counter may change the phase selection signal according to the control signals UP and DN. Specifically, when the level of the control signal UP is high, the up/down counter 93 adds one unit as it is triggered by an adjusting signal. Thereby, according to the new phase selection signal, the multiplexer 257 selects a reference clock having succeeding phase as a sampling clock to advance the phase of the sampling clock. On the other hand, when the level of the control signal UP is low, the up/down counter 93 subtracts one unit as it is triggered by an adjusting signal. Thereby, according to a new phase selection signal, the multiplexer 257 selects a reference clock having preceding phase as a sampling clock to retard the phase of the sampling clock.

Figure 10:
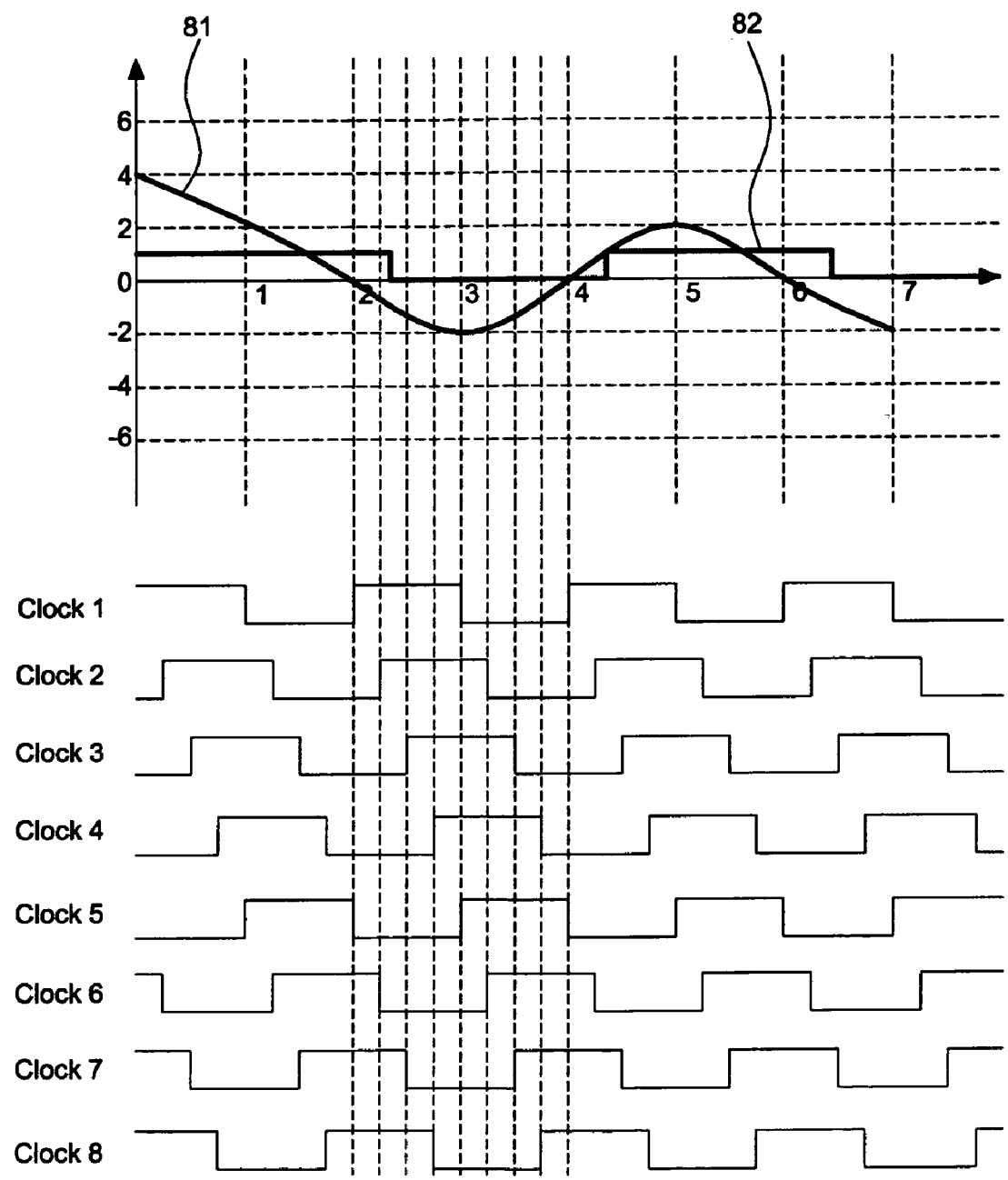
FIG. 10 shows schematic diagrams illustrating the channel signal, comparison signal, and multi-phase clocks.

FIG. 10 shows schematic diagrams illustrating the channel signal 81, comparison signal 82, and multi-phase frequency clocks 1-8. Referring to FIG. 10, it can be clearly seen that the multi-phase frequency clock 1 is the best sampling clock. Accordingly, if the multi-phase frequency clock 3 is selected as the sampling clock, the level of the control signal UP is low and that of the control signal DN is high since the phase of the delay signal lags behind that of the comparison signal. In that case, the up/down counter 93 subtracts one unit as it is triggered by an adjusting signal. Thereby, according to a new generated phase selection signal, the multiplexer 257 selects the multi-phase frequency clock 2 as a sampling clock to retard the phase of the sampling clock. At this time, the phase of the delay signal still lags behind that of the comparison signal, so the level of the control signal UP is still low and that of the control signal DN is still high. Accordingly, the up/down counter 93 again subtracts one unit to have the multiplexer 257 select the multi-phase frequency clock 1 as a sampling clock according to a new generated phase selection signal. Thereby, the phase of the sampling clock is further retarded to reach the best sampling point.

While the invention has been described by way of examples and in terms of the preferred embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A digital frequency/phase recovery circuit for generating a sampling clock according to a frequency and a phase of an input signal, comprising:
   a comparator with hysteresis for receiving the input signal to generate a comparison signal, wherein the comparison signal is set to state "High" when the level of the input signal is higher than a high reference voltage, and the comparison signal is set to state "Low" when the level of the input signal is lower than a low reference voltage;
   a counter for receiving the comparison signal, calculating the number of pulses of the comparison signal in one period relating to a counting clock, and outputting a pulse value, wherein the frequency of the counting clock being higher than that of the comparison signal;
   a frequency determiner for receiving the pulse value, calculating the frequency of the input signal according to the pulse value, and generating a frequency value;
   a multi-phase clock generator for receiving the frequency value and generating multi-phase reference clocks with identical frequency and distinct phases according to the frequency value;
   a transition detector for receiving the comparison signal and generating a transition signal, wherein the transition signal is enabled for a preset period as the comparison signal is changing from a high level to a low level or from the low level to the high level;
   a phase adjuster for receiving the transition signal and the sampling clock and generating a phase selection signal according to the phase relationship between the sampling clock and the transition signal; and
   a multiplexer for receiving the multi-phase reference clocks and selecting one reference clock as the sampling clock according to the phase selection signal.

2. The digital frequency/phase recovery circuit as claimed in claim 1, wherein the multi-phase clock generator comprises:
   a digital to analog converter for receiving the frequency value and converting the frequency value into a control signal; and
   a digital control oscillator for receiving the control signal and generating the multi-phase reference clocks.

3. The digital frequency/phase recovery circuit as claimed in claim 1, wherein the frequency determiner computes an average of multiple pulse values neighboring a smallest pulse value and divides the average by the period corresponding to the smallest pulse value to acquire the frequency value.

4. The digital frequency/phase recovery circuit as claimed in claim 1, wherein the frequency determiner computes an average of multiple pulse values neighboring a largest pulse value and divides the average by the period corresponding to the largest pulse value to acquire the frequency value.

5. The digital frequency/phase recovery circuit as claimed in claim 1, wherein the phase adjuster comprises:
   a delay unit for receiving the sampling clock and delaying the sampling clock with a fixed time to generate a delay signal;
   a phase detector for receiving the delay signal and the transition signal and comparing their phase difference to generate phase control signals; and a up/down counter for receiving the phase control signals and adjusting a phase selection signal according to the phase control signals;

wherein the phase selection signal is added by one unit as the phase of the delay signal advances that of the transition signal, while the phase selection signal is subtracted by one unit as the phase of the delay signal lags behind that of the transition signal.

* * * * *